United States Patent
Colotte et al.

(10) Patent No.: US 6,926,234 B2
(45) Date of Patent: Aug. 9, 2005

(54) ELECTROMECHANICAL TURBOJET THRUST REVERSER WITH CONTINUOUS POSITION CONTROL

(75) Inventors: Baptiste Colotte, Melun (FR); Alexandre Courpied, Paris (FR); Marc Croixmarie, Auvernaux (FR); Patrick Joland, Evry Gregy sur Yerres (FR); Gilles Le Gouellec, Paris (FR); Marion Michau, Thiais (FR)

(73) Assignee: Hispano-Suiza, Colombes (FR)

(*) Notice: Subject to any disclaimer, the term of this patent is extended or adjusted under 35 U.S.C. 154(b) by 0 days.

(21) Appl. No.: 10/678,104

(22) Filed: Oct. 6, 2003

(65) Prior Publication Data

US 2004/0118974 A1 Jun. 24, 2004

(30) Foreign Application Priority Data

Oct. 25, 2002 (FR) .......................................... 02 13409

(51) Int. Cl.[7] .............................................. F02K 1/70
(52) U.S. Cl. ................................................. 244/110 B
(58) Field of Search ................. 244/110 B; 239/265.33, 239/265.19, 265.25; 60/226.2, 230

(56) References Cited

U.S. PATENT DOCUMENTS

| | | | | |
|---|---|---|---|---|
| 4,522,358 A | * | 6/1985 | Dinger et al. ............ | 244/110 B |
| 4,543,783 A | * | 10/1985 | Greune et al. ............. | 60/226.2 |
| 5,192,023 A | * | 3/1993 | Fage et al. ..................... | 239/11 |
| 5,448,884 A | * | 9/1995 | Repp ............................ | 60/223 |
| 5,826,823 A | | 10/1998 | Lymons et al. | |
| 5,960,626 A | * | 10/1999 | Baudu et al. ............... | 60/226.2 |
| 6,286,784 B1 | * | 9/2001 | Hardy et al. ............ | 244/110 B |
| 6,439,504 B1 | | 8/2002 | Ahrendt | |
| 6,526,744 B2 | * | 3/2003 | Ahrendt ........................ | 60/204 |
| 6,598,386 B2 | * | 7/2003 | Johnson et al. ............ | 60/226.2 |
| 6,666,307 B1 | * | 12/2003 | Christensen ................. | 188/134 |
| 6,681,559 B2 | * | 1/2004 | Johnson ........................ | 60/204 |
| 6,684,623 B2 | * | 2/2004 | Langston et al. .......... | 60/226.2 |
| 2002/0157377 A1 | | 10/2002 | Ahrendt | |

* cited by examiner

Primary Examiner—Tien Dinh
(74) Attorney, Agent, or Firm—Oblon, Spivak, McClelland, Maier & Neustadt, P.C.

(57) ABSTRACT

A turbojet thrust reverser includes two doors each controlled by a respective electronic control unit, at least one sensor per door measuring at least one item of position data concerning the door, at least one sensor of each door being connected to the electronic control unit controlling that door, the electronic control units being connected to each other in order to exchange the position data, a FADEC having two channels each connected to both electronic control units in order to receive from each of the electronic control units data concerning the positions of each of the doors and data concerning the operating state of each of the electronic control units, the channels being connected to each other in order to exchange the door position data and the electronic control unit state data so that the airplane pilot is continuously informed about the positions of the doors and the states of the electronic units, even in the event of a breakdown in one of the electronic units and in one of the FADEC channels.

6 Claims, 2 Drawing Sheets

ELECTROMECHANICAL TURBOJET THRUST REVERSER WITH CONTINUOUS POSITION CONTROL

BACKGROUND OF THE INVENTION

The present invention relates to the general field of thrust reversers for bypass turbojets. More particularly, it relates to an electromechanical thrust reverser comprising at least two displaceable elements co-operating in the open position of the reverser to reverse thrust, such as a grid, door, or shell thrust reverser.

Thrust reversers fitted to bypass turbojets are well known in the field of aviation. They are used to increase airplane safety by assisting in the braking thereof during landing. Thrust reversers are generally in the form of least two moving elements, such as sliding doors, which are suitable for being moved relative to the pod of the turbojet by means of control actuators so that when operating in thrust reversal, i.e. in the open position, they constitute an obstacle for a fraction of the gas coming from the turbojet, which fraction is redirected forwards so as to provide the airplane with reverse thrust.

In order to provide the control system of the thrust reverser with accurate information about the position in which the doors of the reverser are to be found, it is known to fit the doors with multiple position sensors that are directly connected to a reverser control unit. Generally, the sensors are positioned on each control actuator and are associated with detectors for detecting the state of each locking system of the reverser. Such sensors and detectors thus provide safety, enabling the pilot to be kept continuously informed about the deployed or retracted positions of the reverser doors.

Since a thrust reverser having two sliding doors generally comprises, for each door, three control actuators and three different locking systems, this leads to a large number of position sensors per reverser. Such an abundance of sensors has the effect of increasing the risk of there being a sensor breakdown, thereby reducing the reliability of the assembly as a whole. This abundance of sensors is also harmful in terms of the overall weight of the thrust reverser.

In addition, the position sensors that are generally used are abutment sensors that indicate only when the reverser is in a deployed position or in a retracted position. Such sensors do not enable sufficiently accurate information to be obtained concerning the exact positions of the doors of the reverser. In the event of one of the doors becoming blocked or jammed, it is difficult or even impossible to determine the exact position in which the thrust reverser is to be found.

OBJECT AND SUMMARY OF THE INVENTION

The present invention thus seeks to mitigate such drawbacks by proposing a thrust reverser which provides continuous information about the positions of the doors, even in the event of a breakdown, thereby increasing airplane safety.

To this end, the invention provides a turbojet thrust reverser for installing on an airplane, the reverser comprising: two doors displaceable between an open position and a closed position of the reverser, each of said doors being controlled by a respective electronic control unit; at least one sensor per door measuring at least one item of position data concerning said door, said at least one sensor of each door being connected to said electronic control unit which controls said door in order to transmit said door position data thereto, said electronic control units being connected to each other in order to exchange said position data; and a full authority digital engine control (FADEC) having two channels each connected to both electronic control units in order to receive the position data from each of the doors from said electronic units together with data concerning the operating state of each of said electronic units, said channels being connected to each other so as to exchange said door position data and said electronic unit state data so that the airplane pilot is continuously informed about the positions of said doors and the states of said electronic units, even in the event of one of said electronic units breaking down and one of said FADEC channels breaking down.

As a result, the exchange of data between the electronic control units and the channels of the FADEC enables the effectiveness of data transmission to the airplane pilot to be improved, particularly in the event of one of the units breaking down or one of the FADEC channels breaking down. This transmission of data to the airplane is provided by duplicating the data, and not by sensor redundancy, thus providing improved reliability and also reducing weight.

Each door is advantageously displaceable under drive from at least one control actuator, said reverser including, for each door, a first sensor located at said at least one control actuator so as to measure the position of said control actuator. Preferably, said first sensor continuously measures the position of said control actuator. Continuous measurement of the position of each door makes it possible specifically to synchronize reverser travel. It also makes it possible quickly to detect any jamming or blocking of the reverser, thereby limiting the potential damage that could arise from jamming or blocking.

Each door is associated with a mechanical blocking device serving to ensure that said door is held in position, said reverser including, for each door, a second sensor measuring data concerning the state of said mechanical blocking device. Similarly, an abutment locking device serving to retain the door can also be provided, in which case the reverser has a third sensor for each door serving to measure state data concerning such a device.

In order to mitigate the effects of two independent breakdowns, each electronic control unit is advantageously connected to the two channels of the FADEC so that the airplane pilot is continuously informed about the positions of the doors and the states of the electronic units, even in the event of one of the electronic units breaking down and one of the channels of the FADEC breaking down.

BRIEF DESCRIPTION OF THE DRAWINGS

Other characteristics and advantages of the present invention appear from the following description given with reference to the accompanying drawings which show an embodiment that is not limiting in any way. In the figures.

DETAILED DESCRIPTION OF AN EMBODIMENT

Figure 1:
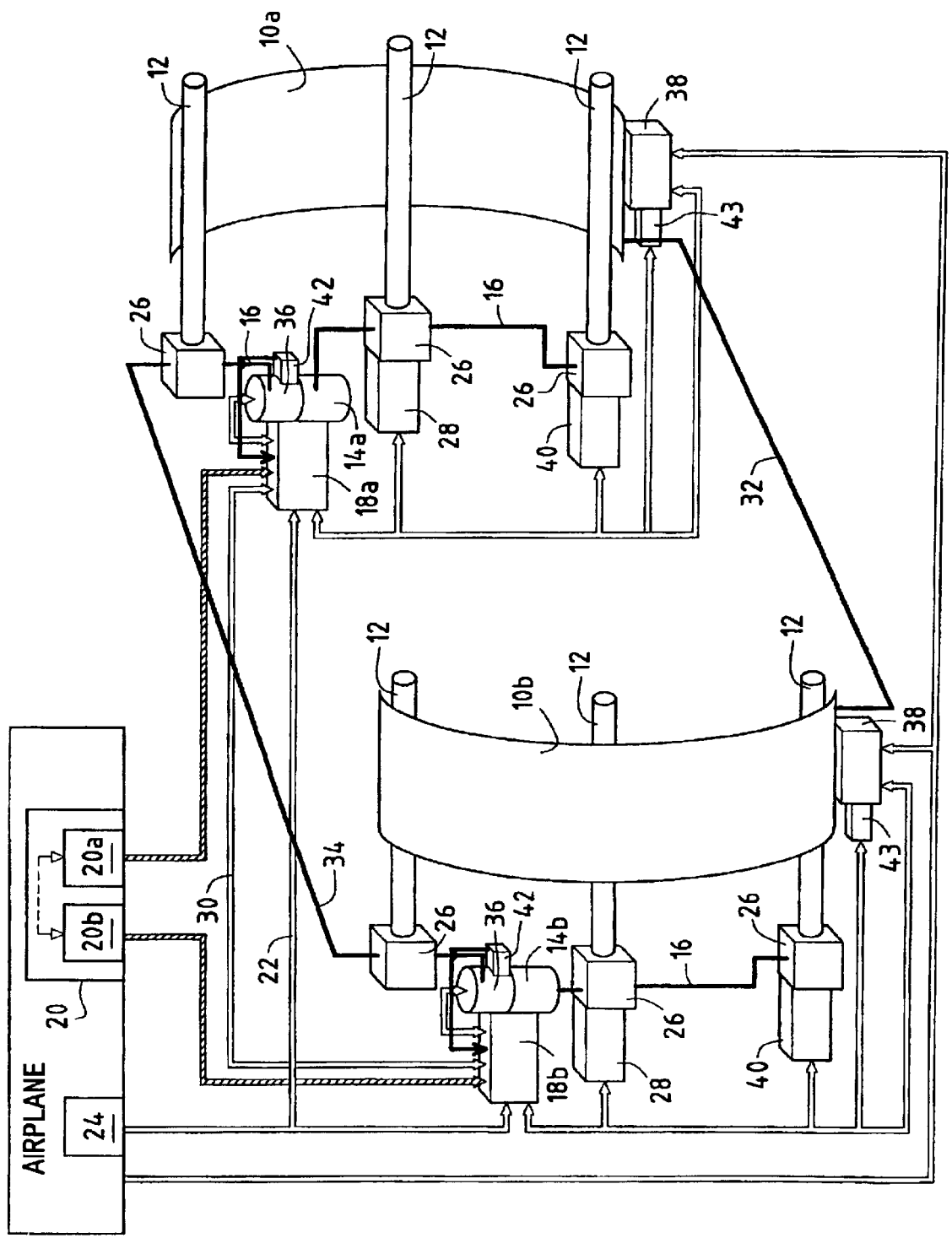
FIG. 1 is a diagram showing an embodiment of a thrust reverser of the invention.

Reference is made initially to FIG. 1 which shows an embodiment of a thrust reverser of the invention.

The thrust reverser has two doors 10a, 10b each displaceable between an open position and a closed position for the reverser by means of at least one control actuator 12 (three actuators are shown in FIG. 1, a central actuator and two actuators positioned respectively at the two side ends of each door).

The reverser also comprises two electric motors 14a, 14b each controlling displacement of one door. These electric motors drive the actuators 12 controlling each door 10a, 10b via transmission shafts 16 interconnecting the control actuators of the corresponding door.

Each electric motor 14a, 14b is mounted directly on an electronic control unit 18a, 18b which governs the entire sequence of moving the two doors and regulates the speed of rotation of its electric motor. Each electronic control unit 18a, 18b is electrically connected to one of the two channels 20a, 20b of a full authority digital engine control 20 referred to herein by the abbreviation FADEC. An order to deploy or to retract the thrust reverser is issued by the FADEC to the electronic units 18a, 18b. It is also possible to integrate the electronic units in the FADEC. The channels 20a, 20b of the FADEC 20 are capable of exchanging data between each other.

The electronic control units 18a, 18b are powered electrically via an electrical harness 22 connected to the electrical power supply network 24 of the airplane on which the turbojet is mounted. The electronic control units transform and adapt the electrical signal for the purpose of powering the electric motors 14a, 14b.

The actuators 12 for controlling the doors of the reverser are of the electromechanical type. They are driven by gearboxes 26 mounted on each of the actuators. The control relationship (speed control or on/off type control) for the reverser doors 10a, 10b is transmitted from the electronic units to each of the control actuators 12 via the electric motors 14a, 14b, the transmission shafts 16, and the gearboxes 26.

A drive takeoff 28 may be provided at one of the control actuators 12 so as to enable the door associated with the control actuator to be operated manually, in particular when performing maintenance operations on the thrust reverser. In the example shown in FIG. 1, the central actuator 12 presents such a takeoff 28 at its gearbox 26. Since the gearboxes of both doors are interconnected, this drive takeoff thus enables an operator performing maintenance to open and/or close the doors of the reverser using a single handle, for example. Access to the drive takeoff 28 for each door may be electrically connected to the electronic control unit 18a, 18b so as to deactivate the electrical power supply during such maintenance operations in order to avoid any untimely deployment of the reverser.

The electronic control units 18a, 18b may also exchange data between each other via an electrical link 30 of the harness type. Such data exchange between the two electronic units serves in particular to compare information concerning the positions of the two doors. A mechanical link 32 between the two doors 10a and 10b, and a flexible synchronizing shaft 34 interconnecting the actuators of the two doors may be provided in order to facilitate synchronizing the displacement of both doors.

The thrust reverser has three levels of locking, each level being capable of retaining the thrust reverser.

A first level of locking is performed by a mechanical blocking device 36 referred to as a "primary latch" which is associated with each door of the reverser. Each primary latch is mounted directly on the electric motor 14a, 14b and it is controlled by the electronic unit 18a, 18b. These primary latches 36 serve individually to retain the door associated therewith. For example, the latches may be of the disk brake type, performing blocking by means of a pin that prevents the transmission shaft from moving.

Given that the two doors are mechanically interconnected by the links 32 and 34, the primary latch 36 of either door constitutes a second level of locking for the other door, and thus constitutes a secondary latch for the other door. The secondary latch is intended to take up loads on the door in the event of the primary latch failing. Thus, if the blocking device on one of the doors is considered as being the primary latch, then the blocking device of the other door can be considered as being its secondary latch, and vice versa.

The third level of locking is achieved by an abutment locking device 38 referred to as a "tertiary latch" which is positioned at one of the side ends of each of the doors or of one door only. These tertiary latches may be connected to the electronic units 18a, 18b, to the FADEC 20, and/or directly to the airplane cockpit. They are preferably controlled directly from the airplane cockpit so as to provide sufficient operating safety and so as to overcome possible common modes. When connected to the FADEC or to the airplane cockpit, the tertiary latches remain operational even in the event of the electronic control units 18a, 18b failing. They enable the loads on the reverser door to be taken up in the event of the primary and secondary latches failing.

Furthermore the thrust reverser of the invention includes at least one sensor or detector per door for measuring at least one item of position data concerning the door 10a, 10b. These sensors or detectors enable the open or closed position of each door of the reverser to be monitored and they are electrically connected to the electronic control unit 18a, 18b of the door controlled by said unit. They are powered electrically by said electronic units.

Advantageously, for each door 10a, 10b, the thrust reverser has a set of sensors comprising a first sensor 40 measuring an item of position data concerning the door, a second sensor 42 measuring an item of state data concerning the primary latch 36, and a third sensor 43 measuring an item of state data concerning the tertiary latch 38.

By way of example, the first sensor 40 measuring door position is positioned on the gearbox 26 of one of the control actuators 12 of the door. The first sensor 40 is connected to the electronic control unit 18a, 18b in order to transmit data thereto concerning the position of the door.

The first sensor 40 preferably measures the position of the control actuator 12 with which it is associated on a continuous basis. For example, the first sensor can be an electrical angular displacement sensor of the "resolver" type providing an electrical signal that is characteristic of the angular position of a rotor (not shown) in the gearbox 26 that is mounted on the control actuator 12 with which the sensor is associated. Such continuous measurement provided by an angular displacement sensor provides information concerning the position of the control actuator at all times, thereby making it possible to synchronize the doors while they are being moved. Such position measurement serves to detect any difference in position between the two doors 10a and 10b, and thus enables the speed of each of the two electric motors 14a and 14b to be controlled via the electronic control units 18a and 18b in such a manner as to obtain proper displacement of the reverser. Continuously measuring the position of each door also serves to detect any blocking or jamming of a door much sooner than is possible when using abutment sensors only. This thus enables the electric motors to avoiding forcing the doors if they become jammed, where such forcing generally has the effect of making the jamming or blocking worse. As a result, the use of angular displacement sensors serves to provide the reverser with automatic protection enabling potential damage to be minimized, and thus minimizing the associated repair costs. Finally, continuous measurement is a way of detecting possible failure of the latches 36, 38 to latch, which failures might otherwise have passed undetected, with such detection improving safety.

The second and third sensors 42 and 43 may be state sensors associated with the primary latch and the tertiary latch providing the electronic control units 18a and 18b of each of the doors with information about the locked or unlocked state of the corresponding latches. The second and third sensors 42, 43 are connected to the corresponding electronic unit 18a, 18b so as to transmit data thereto concerning the position of the corresponding latch. For example, these sensors may be constituted by proximity devices of optical or magnetic type or indeed by mechanical switches.

Figure 2:
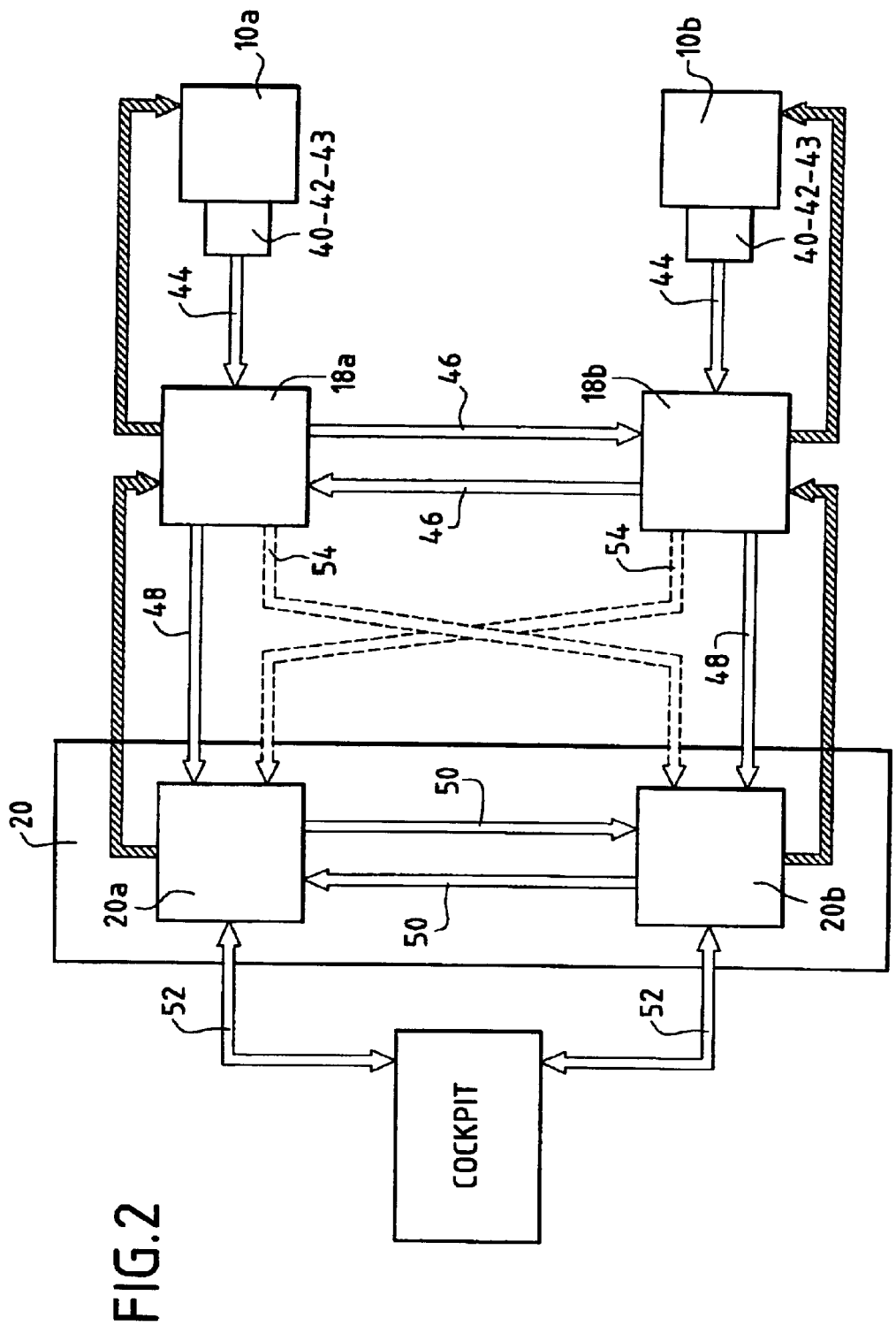
FIG. 2 is a block diagram corresponding to the embodiment of the thrust reverser shown in FIG. 1.

As shown in FIG. 2, the sensors 40, 42, and 43 for each door 10a, 10b transmit door position data and state data concerning the primary and tertiary latches to the electronic unit 18a, 18b controlling the same door (transmission 44). The electronic units 18a, 18b which are interconnected by the electrical link 30 (see FIG. 1) exchange door position data and primary and tertiary latch state data (transmission 46) so that each electronic unit receives the data coming from both sets of sensors. The channels 20a and 20b of the FADEC 20 which are connected to respective ones of the electronic units 18a and 18b thus both receive the data coming from both sets of sensors 40, 42, and 43 (transmission 48). Both channels are thus individually informed about the position of each door 10a, 10b and about the state of each primary and tertiary latch. Furthermore, each electronic control unit 18a, 18b also sends data concerning its own operating state over the corresponding channel 20a, 20b of the FADEC (transmission 48). The channels of the FADEC can exchange data between each other (transmission 50). The FADEC then transmits the data concerning the positions of the two doors 10a, 10b and concerning the states of the primary and tertiary latches to the airplane cockpit, together with data concerning the operating states of the two electronic control units 18a, 18b (transmission 52).

Thus, by means of data crossing over in this way, the thrust reverser of the invention enables the thrust reverser control system to be continuously informed about the positions of both doors of the reverser and the operating states of both electronic units, and this continues to be the case under all breakdown configurations. Thus:

in the event of one of the electronic units 18a, 18b failing: the non-operating state of the electronic unit concerning is sent to the FADEC channels 20a, 20b that is associated therewith. Since each electronic unit receives data concerning the positions of both doors 10a, 10b, this data continuous to be transmitted to the FADEC channel 20a, 20b associated with the remaining electronic unit. In addition, since both FADEC channels 20a, 20b exchange data, each of them is informed about the state of the thrust reverser control system;

in the event of one of the FADEC channels 20a, 20b failing: given that each FADEC channel receives data concerning the positions of both doors and the operating state of both electronic control units, this data continues to be transmitted to the thrust reverser control system over the remaining FADEC channel;

in the event of a breakdown both in one of the electronic units 18a, 18b and in the FADEC channel 20a, 20b associated with the same door 10a, 10b: this situation corresponds to a failure of one of the FADEC channels as described above, the remaining FADEC channel transmitting the data to the thrust reverser control system; and in order to be able to handle a breakdown in one of the electronic control units 18a, 18b and in that one of the FADEC channels 20a, 20b that is not associated with the same door 10a, 10b, provision is advantageously made to connect each electronic control unit to both of the FADEC channels so that the remaining FADEC channel receives all of the data needed for transmission to the thrust reverser control system. This transmission 54 of data between the electronic control units and the "other" FADEC channels is represented by dashed lines in FIG. 2.

What is claimed is:

1. A thrust reverser for a turbojet for fitting to an airplane, the thrust reverser comprising:

two doors displaceable between an open position and a closed position of the reverser, each of said doors being controlled by a respective electronic control unit; and at least one sensor per door measuring at least one item of position data concerning said door, said at least one sensor of each door being connected to said electronic control unit which controls said door in order to transmit said door position data thereto, said electronic control units being connected to each other in order to exchange said position data;

the reverser further comprising a full authority digital engine control (FADEC) having two channels each connected to both electronic control units in order to receive the position data from each of the doors from said electronic units together with data concerning the operating state of each of said electronic units, said channels being connected to each other so as to exchange said door position data and said electronic unit state data so that the airplane pilot is continuously informed about the positions of said doors and the states of said electronic units, even in the event of one of said electronic units breaking down and one of said FADEC channels breaking down.

2. A thrust reverser according to claim 1, wherein each door is displaceable under drive from at least one control actuator, said reverser including, for each door, a first sensor located at said at least one control actuator so as to measure the position of said control actuator.

3. A reverser according to claim 2, wherein said first sensor continuously measures the position of said control actuator.

4. A reverser according to claim 2, wherein each door is associated with a mechanical blocking device serving to ensure that said door is held in position, said reverser including, for each door, a second sensor measuring data concerning the state of said mechanical blocking device.

5. A reverser according to claim 4, wherein each door is associated with an abutment locking device enabling said door to be held in position, said reverser including, for each door, a third sensor measuring data concerning the state of said abutment locking device.

6. A thrust reverser for a turbojet for fitting to an airplane, the thrust reverser comprising:

two doors displaceable between an open position and a closed position of the reverser, each of said doors being controlled by a respective electronic control unit;

means for measuring at least one item of position data for each door, said means for measuring being connected to said electronic control unit which controls said door in order to transmit said door position data thereto;

means for exchanging said position data between said electronic control units; and a full authority digital engine control (FADEC) having two channels each connected to both electronic control means and having means for receiving position data for each of the doors from said electronic units together with data concerning the operating state of each of said electronic units, and means for exchanging said door position data and said electronic unit state data between said channels.

* * * * *